Feb. 16, 1932.  A. C. MENGES  1,845,433
LUBRICATING MEANS FOR MOTOR VEHICLE SPRING SHACKLES
Original Filed July 6, 1920   2 Sheets-Sheet 1
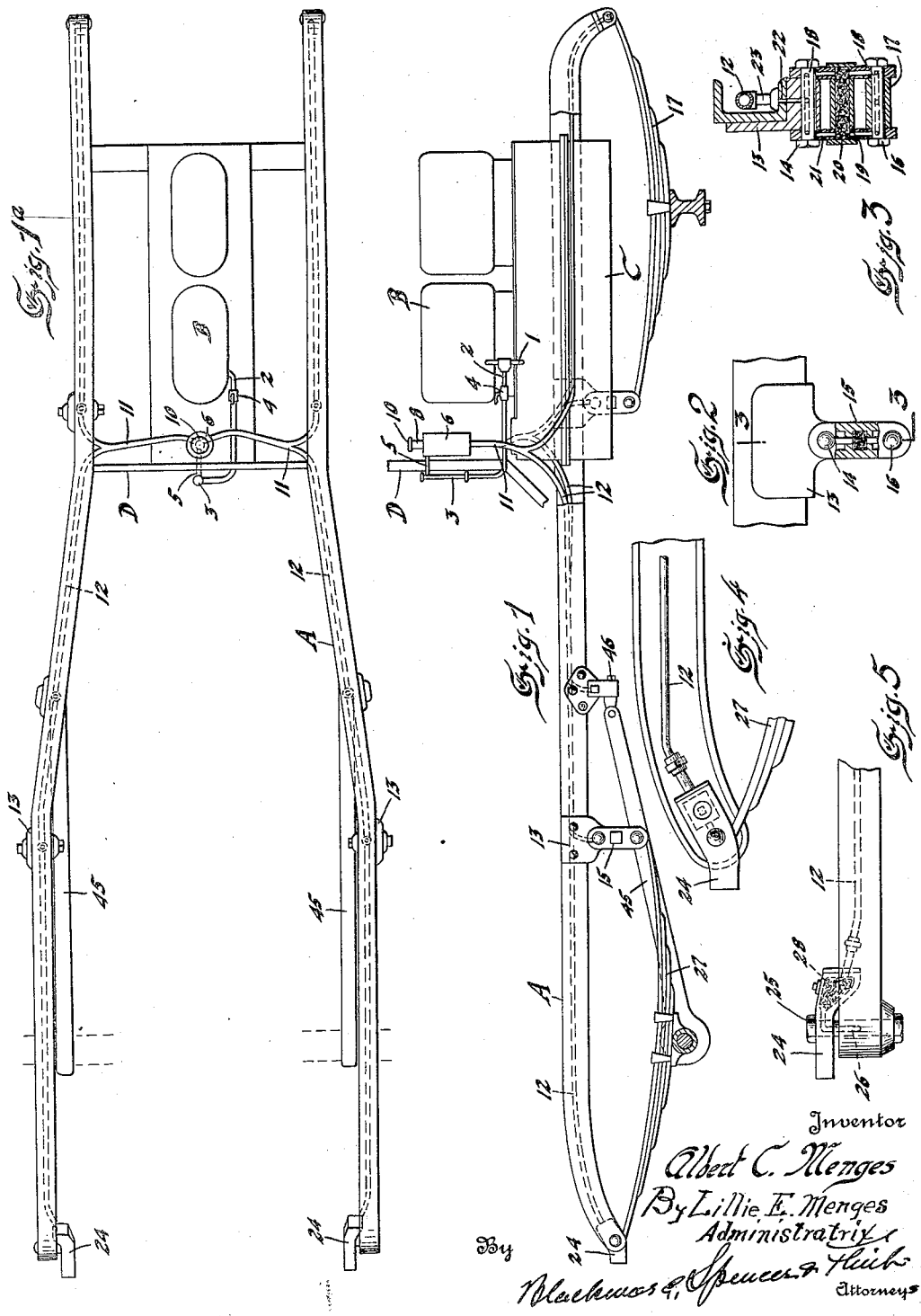

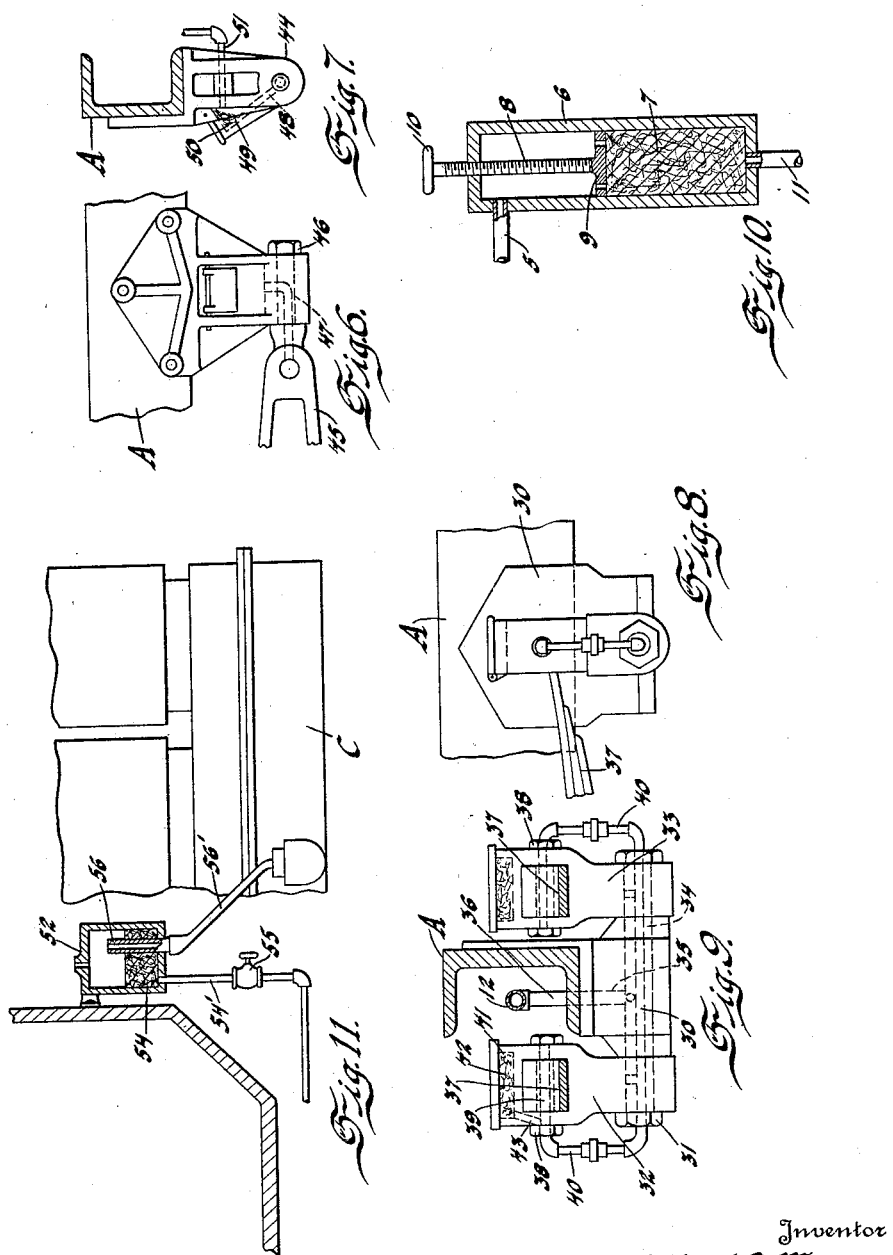

Patented Feb. 16, 1932

1,845,433

UNITED STATES PATENT OFFICE

ALBERT C. MENGES, DECEASED, LATE OF DENVER, COLORADO, BY LILLIE E. MENGES, ADMINISTRATRIX, OF DENVER, COLORADO, ASSIGNOR, BY MESNE ASSIGNMENTS, TO GENERAL MOTORS RESEARCH CORPORATION, OF DETROIT, MICHIGAN, A CORPORATION OF DELAWARE

LUBRICATING MEANS FOR MOTOR VEHICLE SPRING SHACKLES

Original application filed July 6, 1920, Serial No. 394,027, now Patent No. 1,735,175, dated November 12, 1929. Divided and this application filed October 12, 1929. Serial No. 399,382.

This invention relates to lubricating systems for motor vehicles, one of its objects being to provide an automatic system of this character whereby various of the chassis parts such, for example, as the spring shackles and the bearings for radius rods, can be supplied constantly with a lubricant through the medium of the regular force pump oiling system of the conventional type used on various motor vehicles, it being also possible, by means of this improvement, to properly lubricate the chassis parts without the use of a force pump oiling system and by utilizing solely a gravity feed.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a side elevation of a portion of a vehicle and showing the various parts of the lubricating system assembled.

Figure 1—A is a plan view of the corresponding parts.

Figure 2 is a view partly in side elevation and partly in section of the means employed for lubricating the bearings of the links or shackles used at one end of a spring.

Figure 3 is a section on line 3—3, Figure 2.

Figure 4 is a side elevation of a portion of a vehicle frame, one of the shackles thereon and a portion of a spring.

Figure 5 is a plan view of the structure shown in Figure 4.

Figure 6 is a side elevation of the bearings and a portion of the radius rod journaled thereon.

Figure 7 is an end view thereof.

Figure 8 is a side elevation of a modified form of spring connection.

Figure 9 is an end view thereof, the adjacent portion of the frame being shown in section.

Figure 10 is a section through the wick duct and showing the adjusting means therefor.

Figure 11 is a view partly in side elevation and partly in section of a portion of a slightly modified form of system utilizing a gravity feed.

Referring to the figures by characters of reference A designates a portion of the chassis or frame of a motor vehicle on which is mounted a motor B provided with the usual crankcase C constituting an oil reservoir. The force pump used for elevating oil from the crankcase to the various parts of the motor has not been shown but the oil used for this purpose is directed by the pump through a pipe 1 having a right angle extension 2 which extends through the dash D of the vehicle and to the lower end of a glass tube or gage 3 carried by the dash. A valve 4 is provided in the pipe 2 for controlling the flow of lubricant to the gage glass 3. The upper end of the gage glass communicates through a pipe 5 with a small casing 6 in the lower portion of which is arranged an absorbent material indicated at 7 (Figure 10) and which acts as a wick. A screw 8 is adjustably mounted in the upper portion of the casing 6 and has a perforated head 9 at its lower end which bears upon the mass of absorbent material 7 in the lower part of the casing. A handle 10 is provided at the upper end of the screw and by means thereof the head can be adjusted to vary the pressure on the absorbent material and thereby control its efficiency as an absorbent medium.

Pipes 11 extend from the bottom portion of the casing 6 to distributing pipes 12 extending along the sides of the frame or chassis A to points adjacent the various spring and torque or radius rod bearings.

For example where a bracket is secured to the frame as shown at 13 (Figures 2 and 3) there is provided a connecting or pivot bolt 14 on which is mounted a link or shackle 15 which, in turn, is connected by a bolt 16 to one end of the spring 17. Each of these bolts has an oil duct 18 therein provided with outlet openings whereby oil admitted to the duct is free to come into contact with the bearing surfaces of the spring, link and bracket. A pocket 19 is formed in the link between the ends thereof and contains an absorbent and porous material 20. Oil passages 21 extend longitudinally of the link at the ends of this pocket and communicate with the ducts inside of the bolts. Another duct opens through the frame A, as shown at 22 and into the passage in which the upper bolt 14 is located. This passage 22 communicates with the distributing pipe 12 through a branch pipe 23.

In the foregoing construction the porous material at the delivery end of the lubricant supply pipe—that is, adjacent the shackles—is shown between two points to be lubricated; so that the lubricant from the supply line 12 will flow to the upper bolt bearing of the shackle, then to the porous material 20, and then to the lower bolt bearing. This is a proper and sufficient arrangement when the pressure of the lubricant in the supply conduit is quite low, as when it is supplied by gravity from an elevated container, as well also as when the parts are closely fitted so that leakage is not likely to occur at the bearing not having the porous material associated with it. When, however, the lubricant is supplied under considerable pressure as when it comes from the lubricating system of the engine which drives the vehicle or from some other source of high pressure, or when the bearings are less carefully fitted as is more frequently the case, such porous material should be arranged immediately adjacent and ahead of each bearing to be lubricated, as is the case at the rear ends of the frame members and rear springs in the embodiment of the invention illustrated. In such an arrangement the supply or lubricant to each bearing will be restrained to a degree by the porous material through which it flows, and overflow or leakage of lubricant at the bearings which are lubricated, will be prevented. Separate and distinct masses of porous material may, however, be arranged adjacent each bearing even when the pressure of the lubricant supply is comparatively low; and as a matter of fact better results will thereby ordinarily be secured, especially after the vehicle has been used for a time and the joints to be lubricated have become somewhat worn.

With the foregoing explanation, it is shown at other points in the vehicle structure lubricant boxes, one of which as indicated at 24 (Figs. 4 and 5) can be attached to the frame, as ordinarily, by a bolt 25 having an oil duct 26 opening into the spring 27 mounted on the bolt. In this box is provided a pocket 28 containing an absorbent and porous material as indicated and which acts to retard the flow of oil, the duct in the bolt 25 being in communication with the pocket. This pocket is also in communication with the pipe 12 as is clearly indicated in Figures 4 and 5. A spring connection of different type is shown in Figures 8 and 9 where springs 37 at opposite sides of a frame bar of the chassis are supported at one end by bracket 30, shackles 32 and 33 being connected at opposite ends to the springs and the bolt. A duct 34 is extended longitudinally within the bolt 31 and has outlets opening into the shackles and into the bracket 30, there being an additional duct 35 within the bracket and extending from a branch pipe 36 attached to the distributing pipe 12. The springs 37 are carried by pivot bolts 38 mounted in the shackles and each of these pivot bolts has a longitudinal duct 39 opening to the outer surface of the bolts. The ducts 39 and 34 in the bolts 38 and 31 respectively are connected by pipes 40. A pocket 41 is formed in the upper portion of each shackle and contains an absorbent material indicated at 42 and a duct 43 extends upwardly to this pocket from the adjacent duct 39. Thus it will be seen that when a lubricant is directed into the various ducts from the distributing pipes 12, a portion thereof will be absorbed by the material 42 in each shackle and will subsequently be supplied from this absorbent material downwardly through the duct 43 to the various bearings. In other words the absorbent material in the pocket provides a surplus supply of lubricant.

The bearing 44 provided for the radius rod 45 (Figures 6 and 7) has the usual bolt 46 extending from the radius rod and provided with a duct 47. This duct communicates through a passage 48 with a pocket 49 containing an absorbent material indicated at 50 in Figure 7. A branch pipe 51 extends to this pocket from the distributing pipe 12.

It is to be understood that similar arrangements of absorbent containing pockets having ducts leading therefrom to bearings, can be provided wherever necessary, all of the pockets being in communication with the distributing pipe 12. Thus it will be obvious that when the motor is in operation the force pump will not only lubricate the parts of the motor but a portion of the elevated lubricant will be forced through the gage glass 3 and into the casing 6 from which it will flow downwardly through the perforated head 9 and be absorbed by the material 7. Surplus lubricant thus absorbed will travel through the branch pipe 11 to the distributing pipe 12 and thence to the various wicks or absorbent materials located at the different bearings from which the lubricant will be directed to the wearing surfaces of the bearings, in the manner hereinbefore pointed out. By adjusting the head 9 so as to increase or reduce the compression of the material 7, the efficiency of said material as an absorbent medium can be controlled.

Where no force pump is provided for lubricating and it becomes necessary to depend upon gravity, a casing 52 can be arranged above the level of the parts to be lubricated, as shown in Figure 11. The casing 52 contains an absorbent material 54 extending to a desired level therein and an outlet pipe 54′ having a valve 55 extends from the bottom of the casing to the distributing pipe. An overflow tube or chamber 56 is extended above the absorbent material and is in communication with the interior of the crankcase by means of a pipe 56′ so that when lubricant is poured into the casing 52 and cannot all be absorbed by the material 54, the surplus can overflow into the tube or chamber 56 and enter the crankcase C.

In view of the premises it will be appreciated that in the lubricating system wherein the invention consists the flow of lubricant to the several bearings (which is along a conduit which is always open) which would otherwise drip continuously from the bearings, is held back and restrained, and its flow regulated to a degree, by the masses of absorbent material at the several bearings and through which the lubricant flows. The supply of lubricant is always under some pressure and when, as in the preferred form of the invention, the lubricant is derived from the pressure lubricating system of the engine, it is under a comparatively high pressure. In that case and as hereinbefore appears, it is desirable that the pressure of the lubricant be reduced and regulated by causing it to flow through the casing 6 and the porous material under pressure therein, before it flows into the distributing system of conduits leading to the various chassis bearings to be lubricated.

What is claimed is:

1. In a lubricating device of the class described, a bracket fastened to a motor vehicle frame member and having a bearing for a shackle bolt; an oil supply conduit permanently associated with said frame member and through which oil is supplied to said bearing; a shackle bolt supported in said bearing; a shackle supported by said bolt and having a chamber for containing an absorbent material; a second shackle bolt supported by said shackle and spaced apart from said first mentioned bolt; and a conduit system through which oil is conducted from said bearing to said chamber and to said second mentioned shackle bolt.

2. In a lubricating device of the class described, a bracket fastened to a motor vehicle frame member and having a bearing for a shackle bolt; an oil supply conduit permanently associated with said frame member and through which oil is supplied to said bearing; a shackle bolt supported in said bearing and having a longitudinally extending channel which receives oil from said oil supply conduit; a shackle supported by said bolt and having a chamber for containing an absorbent material; and a second shackle bolt supported by said shackle and spaced apart from said first mentioned bolt; said shackle having a passage through which oil is supplied from the channel in said first mentioned shackle bolt to said chamber and to a bearing through which said second mentioned shackle bolt extends.

3. In a lubricating device of the class described, a bracket fastened to a motor vehicle frame member and having a bearing for a shackle bolt; an oil supply conduit permanently associated with said frame member and through which oil is supplied to said bearing; a shackle bolt supported in said bearing and having a longitudinally extending channel which receives oil from said oil supply conduit; a shackle supported by said bolt and having a chamber for containing an absorbent material; and a second shackle bolt supported by said shackle and spaced apart from said first mentioned bolt, and having also a longitudinally extending channel; said shackle having a passage through which oil is supplied from the channel in said first mentioned shackle bolt to said chamber and to the channel in said second mentioned shackle bolt.

4. In a lubricating device of the class described, a bracket fastened to a motor vehicle frame member and having a bearing for a shackle bolt; an oil supply conduit permanently associated with said frame member and through which oil is supplied to said bearing; a shackle bolt supported in said bearing and having a longitudinally extending channel which receives oil from said supply conduit; a shackle supported by said bolt and having a chamber for containing an absorbent material; a second shackle bolt supported by said shackle and spaced apart from said first mentioned bolt, and having also a longitudinally extending channel; and a conduit through which oil is supplied from the channel in said first mentioned shackle bolt to said chamber and to the channel in said second mentioned shackle bolt.

5. In a lubricating device of the class described, a bracket fastened to a motor vehicle frame member and having a bearing for the upper end of a shackle; an oil supply conduit permanently secured to said frame member and through which oil is supplied to said bearing; a shackle supported by said bearing and having a chamber for containing an absorbent material; a second bearing at the lower end of said shackle; and a conduit system through which oil is conducted from said first-mentioned bearing to said chamber and to said second-mentioned bearing.

6. In a lubricating device of the class described, a shackle having side members spaced apart from one another, and a chamber arranged between said side members for containing an absorbent material; a bracket fastened to a motor vehicle frame member and having a bearing for the upper end of said shackle; an oil supply conduit permanently associated with said bearing and through which oil is supplied thereto; a second bearing at the lower end of said shackle; and a conduit system through which oil is conducted from said first-mentioned bearing to said chamber and to said second-mentioned bearing.

7. In a lubricating device of the class described, a shackle having side members spaced apart from one another, and a chamber arranged between said side members for containing an absorbent material; a bracket fastened to a motor vehicle frame member and having a bearing for the upper end of said shackle; a second bearing at the lower end of said shackle; and a conduit system through which oil is supplied to said two bearings and to said chamber.

In testimony whereof I have signed this specification this 25 day of September, 1929.

LILLIE E. MENGES,
*Administratrix of the Estate of Albert C. Menges, Deceased.*